Feb. 14, 1939.　　　　C. SANFORD, JR　　　　2,147,063
LINE GUIDE TIP FOR FISHING RODS
Filed Oct. 1, 1937
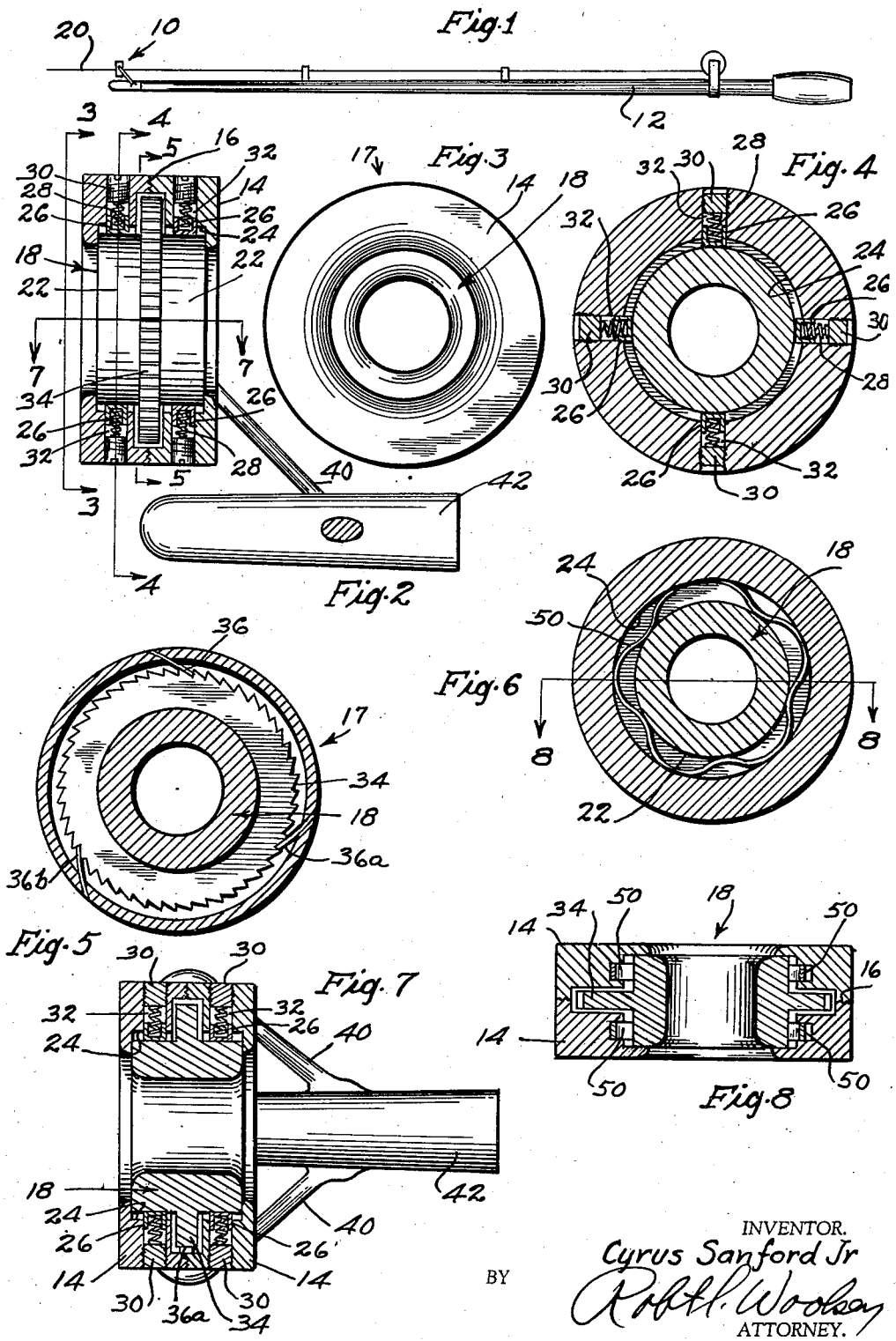
INVENTOR.
Cyrus Sanford Jr
BY
Rob't H. Woolsey
ATTORNEY.

Patented Feb. 14, 1939

2,147,063

UNITED STATES PATENT OFFICE 2,147,063

LINE GUIDE TIP FOR FISHING RODS

Cyrus Sanford, Jr., Venice, Calif.

Application October 1, 1937, Serial No. 166,811

4 Claims. (Cl. 43—24)

All line guide tips, of which applicant has knowledge, comprise eyelets which are held in fixed position with respect to the fishing rod to which they are attached. This construction is satisfactory for short periods of use, however, because of minute particles of abrasive material, such as sand, becoming lodged in the line, the line guides, and especially the tips soon wear to a point where distinct grooves are formed in the lower half of the guide.

To those who are familiar with this condition it is not necessary to mention the fact that lines are quickly frayed and torn to a point where they are no longer of use.

With the foregoing fact in mind, it is a prime object of the present invention to provide means which will force the eyelet of a fishing rod tip through a circular path to equalize wear of the eyelet, by the association of mechanical devices to permit the eyelet to be moved downwardly under pressure, and to concurrently be forced an integrated distance through a circular path, each time pressure is placed upon the eyelet of the tip.

Referring now to the drawing of which there is one sheet, it will be noted that:

Figure 1 is a side elevation of a typical fishing rod, wherein the device of this invention is shown in operative position.

Figure 2 is a view partially in sectional elevation, showing one form of spring suspension to support the eyelet of a line tip.

Figure 3 is a front elevation of the tip as seen on line 3—3, Figure 2.

Figure 4 is a view partially in sectional elevation as seen on line 4—4, Figure 2, showing the type of spring suspension partially shown in Figure 2.

Figure 5 is a view partially in sectional elevation showing a ratchet and pawl arrangement to effect digit rotation of the eyelet.

Figure 6 is a view partially in sectional elevation showing a modified form of spring suspension, but wherein the pawl and ratchet digit rotational means are retained.

Figure 7 is a transverse sectional view taken on line 7—7, in Figure 2, showing further detail of structure.

Figure 8 is a transverse sectional view taken on line 8—8, in Figure 6 showing additional detail of construction.

The device 10 of this invention is adapted to be used upon a conventional fishing rod 12 for the purpose of guiding a line when the same is being payed out or reeled in, as the case may be, in such a manner as to prevent the formation of grooves in the eyelet of the guide.

As shown in the drawing the device 10 comprises half-shells 14 which are adapted to be screwed together by means of threads 16 to form a unit 17. The interior of the unit 17 is hollowed to receive an apertured structure 18 for the purpose of guiding a line 20. The structure 18 is provided with collars 22 which are spaced from the annular walls 24 of the interior of the structure 17, and are adapted to rest upon cup-like shoes 26 which are held in position bearing against the collars 22 by means of extensile springs 28, the other ends of which abut threaded plugs 30 which are screwed into openings in the wells 32 within which the shoes 26 are adapted to slide when under pressure.

Extending circumferentially of and around the mid-portion of the structure 18, I form ratchet teeth 34, which, as shown in Figure 5, is adapted to co-operate with a plurality of pawls 36, 36a, and 36b, which are based within the unit 17 substantially in the manner shown.

As shown in Figure 4 I prefer to use four springs 28 to support each of the collars 22 which are formed integral with the eyelet or apertured structure 18, whereby the unit 17 will be held in spaced relation to the inner walls 24 of the structure 17.

The device 10 may readily be supported upon brackets 40 which are secured to ferrule 42 which is adapted to cover the tip end of the rod 12.

In Figure 6, I show a modified form of construction, wherein the essential difference from the form of device shown in Figures 2 to 5, inclusive, resides in the type of spring used to support the apertured structure 18. As indicated in the drawing I support the collars 22 upon a crimp spring 50 which alternately bears against the walls 24 and upon the collars 22. It is necessary in this form of construction that the spacing between the collars 22 and the walls 24 be slightly greater than in the previously described form of construction. In all respects other than in the type of spring employed, the device shown in Figure 6 is similar to that shown in Figures 2 to 5 inclusive.

To place the device of this invention in operation it is only necessary to slip the ferrule 42 over the end of a fishing rod, such as is indicated at 12 in the drawing, thereafter, the functioning of the device is fully automatic and operates as follows.

As soon as a strike is had upon a hook attached to the line 20, or when reeling in the payed out line, a downward pull is exerted upon the line, which, because the rod is always held at an angle to the plane in which the line extends, invariably causes pressure of varying degrees to be exerted in a downward direction upon the eyelet or apertured structure 18, which pressure invariably occurs at the same point, which is of course the lowest point of the eyelet.

However in the device of this invention, such pressure upon the eyelet, as above referred to, will cause the eyelet to move downwardly against the springs 28 which in yielding under the line pressure exerted upon the eyelet causes the same to move downwardly against the pawl 36b and permitting the pawl 36a to engage the next tooth on the ratchet wheel 34, so that upon release of pressure exerted upon the eyelet and its being forced to normal position by reason of the action of compressed springs 28, the eyelet will be forced in a clock-wise direction the distance of one of the teeth of the ratchet 34, thereby bringing a new surface to the lower most point in the eyelet and ensuring that no one point on the eyelet will be subject to excessive wear, but ensuring that all points thereon will receive equal wear, which as a consequence thereof, makes for greater utility and value to the user.

In the form of the invention shown in Figure 6, the crimp spring 50 is adapted to permit the eyelet to yield under pressure, after which its operation is identical to that just previously described, the same uniform wear being obtained.

From the foregoing it will be apparent that I have provided a novel means to rotate the eyelet of a line guide for fishing rods, which rotation prevents spot grooving of the eyelet, hence lengthens the life of and the general usefullness of the guide.

It is obvious that various changes and modifications and variations may be made in practicing the invention in departure from the particular showing of the drawing and description as given, without, however, departing from the true spirit of the invention as defined by the scope of the appended claims.

I claim:

1. A line guide for fishing rods comprising a housing, an apertured eyelet within said housing, spring means to yieldably support said eyelet, ratchet teeth on said eyelet, pawls in said housing, said pawls being adapted to engage one of said ratchet teeth whereby the same may be partially rotated upon movement of said eyelet in a downward direction, and others of said pawls being adapted to prevent counter-rotation of said eyelet, and means to support said guide upon a ferrule.

2. A line guide for fishing rods, said guide comprising a housing, an eyelet within said housing, collars upon said eyelet, a plurality of springs adapted to place pressure upon said collars to hold the same in spaced relation to said housing, ratchet teeth on said eyelet, pawls based in said housing structure, one of said pawls being adapted to engage said ratchet teeth to force the same in a rotational direction when said eyelet is forced downwardly against certain of said springs, and others of said pawls being adapted to prevent counter-rotation of said eyelet, and means to support said housing upon a ferrule.

3. In a line guide for fishing rods, a housing, an eyelet within said housing, collars upon said eyelet, said collars being in the form of annular flanges and projecting in clearance of said housing structure, a plurality of extensile springs adapted to support said eyelet within said housing, ratchet teeth on said eyelet, pawls based in said housing, one of said pawls being adapted to engage said ratchet teeth to force the same in rotational direction when said eyelet is forced downwardly against certain of said springs, and others of said pawls being adapted to prevent counter-rotation of said eyelet, and means to support said housing upon a ferrule.

4. In a line guide for fishing rods, a housing, an eyelet within said housing, collars upon said eyelet, a crimp spring interposed between said housing and said collars whereby said eyelet may be yieldably supported within said housing, a ratchet on said eyelet, pawls, said pawls being based within said housing, one of said pawls being adapted to engage said ratchet to force said eyelet in a rotational direction when said eyelet is forced downwardly upon said spring, and others of said pawls being adapted to prevent counter-rotation of said eyelet, and means to support said housing upon a ferrule.

CYRUS SANFORD, JR.